United States Patent
Nishimura et al.

(10) Patent No.: US 9,475,498 B2
(45) Date of Patent: Oct. 25, 2016

(54) CONTROL APPARATUS FOR VEHICLE

(71) Applicants: Naoki Nishimura, Nagoya (JP);
Yusuke Nakade, Toyota (JP);
Masahiro Karasawa, Toyota (JP);
Kazumi Shine, Toyota (JP)

(72) Inventors: Naoki Nishimura, Nagoya (JP);
Yusuke Nakade, Toyota (JP);
Masahiro Karasawa, Toyota (JP);
Kazumi Shine, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/438,073

(22) PCT Filed: Jan. 25, 2013

(86) PCT No.: PCT/JP2013/051584
§ 371 (c)(1),
(2) Date: Apr. 23, 2015

(87) PCT Pub. No.: WO2014/115300
PCT Pub. Date: Jul. 31, 2014

(65) Prior Publication Data
US 2015/0291174 A1    Oct. 15, 2015

(51) Int. Cl.

| | |
|---|---|
| B60W 10/06 | (2006.01) |
| B60W 10/10 | (2012.01) |
| B60W 30/192 | (2012.01) |
| F16H 61/28 | (2006.01) |
| B60W 30/18 | (2012.01) |
| F02N 11/08 | (2006.01) |
| F16H 61/16 | (2006.01) |
| F16H 61/02 | (2006.01) |
| F16H 61/08 | (2006.01) |
| F16H 61/32 | (2006.01) |

(52) U.S. Cl.
CPC ............ *B60W 30/192* (2013.01); *B60W 10/06* (2013.01); *B60W 10/10* (2013.01); *B60W 30/18027* (2013.01); *F02N 11/0822* (2013.01); *F16H 61/0213* (2013.01); *F16H 61/08* (2013.01); *F16H 61/16* (2013.01); *F16H 61/28* (2013.01); *B60Y 2300/18016* (2013.01); *B60Y 2300/436* (2013.01); *F16H 2061/326* (2013.01); *F16H 2312/14* (2013.01)

(58) Field of Classification Search
None
See application file for complete search history.

(56) References Cited

U.S. PATENT DOCUMENTS

| | | | | |
|---|---|---|---|---|
| 5,188,070 A | * | 2/1993 | Otsuka | B60W 10/02 477/167 |
| 6,383,116 B1 | * | 5/2002 | Warren | B60W 10/02 477/81 |
| 2010/0286883 A1 | | 11/2010 | Kato et al. | |
| 2012/0010045 A1 | * | 1/2012 | Nedorezov | B60W 10/023 477/79 |

FOREIGN PATENT DOCUMENTS

| | | |
|---|---|---|
| JP | 2007 71282 | 3/2007 |
| JP | 2009 179205 | 8/2009 |
| JP | 2010 173607 | 8/2010 |

OTHER PUBLICATIONS

International Search Report Issued Apr. 16, 2013 in PCT/JP13/051584 Filed Jan. 25, 2013.

* cited by examiner

*Primary Examiner* — Edwin A Young
(74) *Attorney, Agent, or Firm* — Oblon, McClelland, Maier & Neustadt, L.L.P.

(57) ABSTRACT

In a control apparatus for a vehicle that changes over a range of an automatic transmission by operating an electric shift actuator and that starts up an engine by operating a starter motor, for example, when an occupant of a vehicle that has carried out idling stop operates a shift lever, the operation of the shift actuator corresponding thereto is started, and the operation of the starter motor is started after the lapse of a predetermined period therefrom. Thus, while the starting responsiveness of the vehicle is enhanced, a fall in battery voltage is restrained from adversely affecting the operation of the shift actuator, and the occurrence of a shock and a decrease in driveability are suppressed as well.

9 Claims, 10 Drawing Sheets

FIG.3

|     | C1 | C2 | C3 | C4 | B1 | B2 | F |
|-----|----|----|----|----|----|----|---|
| P   | ×  | ×  | ×  | ×  | ×  | ×  | × |
| R   | ×  | ×  | ×  | ○  | ×  | ○  | × |
| N   | ×  | ×  | ×  | ×  | ×  | ×  | × |
| 1st | ○  | ×  | ×  | ×  | ×  | ◎  | △ |
| 2nd | ○  | ×  | ×  | ×  | ○  | ×  | × |
| 3rd | ○  | ×  | ○  | ×  | ×  | ×  | × |
| 4th | ○  | ×  | ×  | ○  | ×  | ×  | × |
| 5th | ○  | ○  | ×  | ×  | ×  | ×  | × |
| 6th | ×  | ○  | ×  | ○  | ×  | ×  | × |
| 7th | ×  | ○  | ○  | ×  | ×  | ×  | × |
| 8th | ×  | ○  | ×  | ×  | ○  | ×  | × |

○ ENGAGED
× RELEASED
◎ ENGAGED AT TIME OF ENGINE BRAKE
△ ENGAGED ONLY AT TIME OF DRIVING

CONTROL APPARATUS FOR VEHICLE

TECHNICAL FIELD

The invention relates to a control apparatus that starts up an engine of a vehicle and that changes over a range of an automatic transmission, and more particularly, to a control apparatus that changes over a range of an automatic transmission by operating an electric actuator in response to an operation by a occupant.

BACKGROUND ART

Conventionally, there has been known a speed change control apparatus of so-called shift-by-wire (hereinafter abbreviated as SBW) type that is designed to mechanically decouple a shift lever that is operated by a occupant of a vehicle from an oil pressure control circuit of a transmission, detect operating circumstances of the shift lever through the use of a sensor and a switch, and operate a manual valve of the oil pressure control circuit through the use of an electric shift actuator (e.g., see Patent Document 1).

In a control system disclosed in Patent Document 1, an engine that has carried out idling stop is restarted in response to a shift operation by a driver. For example, cranking for starting up the engine is started in response to an operation of changing over the shift lever to a forward running range (D). After it is determined that the start-up has been completed as a result of the racing of engine rotation, the shift actuator is operated, and the valve position of the manual valve is changed over from a neutral range (N) to the forward running range.

RELATED ART DOCUMENT

Patent Document

Patent Document 1: Japanese Patent Application Publication No. 2010-173607 (JP-2010-173607 A)

SUMMARY OF THE INVENTION

Problem to Be Solved by the Invention

However, if an attempt is made to operate the shift actuator after the completion of the start-up of the engine as in the foregoing conventional example, the starting responsiveness of the vehicle becomes low. The reason for this is as follows. That is, as exemplified in FIG. 8, cranking is started (in an engine start-up mode: from a time t1) in response to the operation by a occupant (at a time t0), and an engine rotational speed Ne rises (Ne≥Ne*). After it is determined that the start-up has been completed (at a time t2), the operation of the shift actuator is started (ACT: from a time t3), and the manual valve changes over to the forward running range (at a time t4). Then, a forward clutch is engaged (at a time t5), and the vehicle starts.

Thus, with a view to shortening the time to the start of the vehicle, it is also conceivable to operate the shift actuator (ACT: from the time t1) substantially simultaneously with the start of cranking as shown in FIG. 9. In this manner, however, due to the influence of a rapid fall in a battery voltage V resulting from the operation of the starter motor, the operation of the shift actuator may become slow or unstable (schematically indicated by a zigzag line ACT in the drawing), and it may be determined in some cases that a failure has occurred.

Besides, while the engine rotational speed Ne rapidly rises during start-up (from the time t1 to the time t5), the valve position of the manual valve changes over (at the time t3), and the increasing discharge pressure of an oil pump is applied to the forward clutch at once and causes an engagement shock. There is also a concern over feeling as if the vehicle were jumping out (i.e., a decrease in driveability).

In view of these points, it is an object of the invention to restrain a fall in battery voltage from adversely affecting the operation of a shift actuator, stabilize the operation of changing over the range of an automatic transmission, and suppress the occurrence of a shock and a decrease in driveability while enhancing the starting responsiveness of a vehicle from idling stop.

Means for Solving the Problem

In order to achieve the foregoing object, according to the invention, the operation of the shift actuator is first started, and the start of the operation of the starter motor is then delayed for a while.

That is, the invention targets a control apparatus for a vehicle that changes over a range of an automatic transmission through operation of an electric shift actuator, and that starts up an engine through operation of a starter motor. This control apparatus for the vehicle is characterized by starting operation of the starter motor after a predetermined period has elapsed since start of operation of the shift actuator.

According to the foregoing matter used to specify the invention, for example, when a occupant performs one, two or more predetermined operations during stoppage of the vehicle, the operation of the shift actuator is thereby started, and the range of the automatic transmission is changed over. After the lapse of a predetermined period since the start of the operation of the shift actuator, the starter starts operation. In consequence, even when the voltage of the battery rapidly falls as a result of the operation of this starter motor, the adverse effect on the operation of the shift actuator is alleviated. Thus, the operation of changing over the range of the automatic transmission can be stably ensured.

Besides, when the changeover of the range is completed, the vehicle can be started through engagement of the forward clutch. Therefore, if it is determined that the start-up has been completed after the cranking of the engine, the vehicle can start immediately. As a result, the starting responsiveness of the vehicle is enhanced. Moreover, the racing of engine rotation results from start-up after the completion of the changeover of the range of the automatic transmission, so the occurrence of a shock and a decrease in driveability can be suppressed as well.

In order to restrain a fall in battery voltage from affecting the operation of the shift actuator as described above, the predetermined period preferably includes at least a first half of an operation period (i.e., from the start of the operation to the completion thereof) of the shift actuator. The reason for this is as follows. A relatively large current flows through the shift actuator as well for a while since the start of the operation thereof. Therefore, if the battery voltage has rapidly fallen at this time, inconveniences tend to occur, and it may also be determined that a failure has occurred due to a further fall in battery voltage.

More preferably, the predetermined period may be a period to attainment of a state where a range changeover mechanism of the automatic transmission, which is driven by the shift actuator, completes operation through inertia. The reason for this is as follows. In this manner, even when the operation of the starter motor starts after the end of the predetermined period and the operation of the shift actuator becomes unstable due to a rapid fall in battery voltage, the range changeover mechanism completes operation through inertia.

Besides, more reliably, the predetermined period may be a period to completion of operation of a range changeover mechanism of the automatic transmission, which is driven by the shift actuator. In this manner, even when the battery voltage rapidly falls as a result of the operation of the starter motor, the operation of the shift actuator is not adversely affected.

Then, in order to determine whether or not the foregoing predetermined period has elapsed, the control apparatus for the vehicle may be equipped with, for example, with a sensor that detects an operation position of the shift actuator, and may determine, based on a signal from this sensor, whether or not the predetermined period has elapsed.

Besides, the control apparatus for the vehicle may be equipped with a sensor that detects an operation position of a range changeover mechanism of the automatic transmission, which is driven by the shift actuator, and may determine, based on a signal from this sensor, whether or not the predetermined period has elapsed.

Besides, in the case where the shift actuator changes over a range of the automatic transmission by changing a valve position of a manual valve of an oil pressure control circuit of the automatic transmission, the control apparatus for the vehicle may be equipped with a sensor that detects a valve position of the manual valve, and may determine, based on a signal from this sensor, whether or not the predetermined period has elapsed.

Furthermore, the control apparatus for the vehicle may determine that the predetermined period has elapsed, when a preset time has elapsed since outputting of a command signal for causing the shift actuator to start operation. In this case, a time to the completion of the operation of the shift actuator or the range changeover mechanism as described above, or a time to the completion of the changeover of the manual valve of the oil pressure control circuit may be checked, and a matching time may be set in consideration of the response delay of control as well.

For example, in the case of a common shift lever, the time required for a changeover from a parking range (P) to a forward running range (D) is relatively long, and the time required for a changeover from a neutral range (N) to the forward running range (D) is relatively short. Therefore, a length of a time for determining whether or not the predetermined period has elapsed preferably differs depending on the range of the automatic transmission that is changed over through operation of the shift actuator.

Still further, the control apparatus for the vehicle preferably executes control of changeover of the range of the automatic transmission through operation of the shift actuator and start-up of the engine through operation of the starter motor, in response to performance of a single operation of changing over the range of the automatic transmission from a non-running range to a running range by a occupant of a vehicle. In this manner, the range of the automatic transmission is changed over through the single operation by the occupant, and the engine is started up as well. As a result, the vehicle becomes ready to start.

The operation and effect of the aforementioned invention are especially advantageous in a configuration in which the shift actuator and the starter motor are supplied with an electric power from the same battery. In this case, there is no need to separately mount the vehicle with the battery for supplying electric power to the shift actuator and the battery for supplying electric power to the starter motor. Therefore, advantages such as the enhancement of mountability and the prevention of cost rise are also obtained.

Effect of the Invention

As described above, with the control apparatus for the vehicle according to the invention, in the case where the range of the automatic transmission is changed over by the electric shift actuator and the engine is started up by the starter motor, the operation of the starter motor is started after the predetermined period has elapsed since the start of the operation of the shift actuator. Therefore, even if the battery voltage rapidly falls as a result of the operation of this starter motor, the operation of the shift actuator can be restrained from being adversely affected. In consequence, the operation of changing over the range of the automatic transmission can be stably ensured, and the occurrence of a clutch engagement shock and a decrease in driveability can be suppressed as well, while enhancing the starting responsiveness of the vehicle.

BRIEF DESCRIPTION OF THE DRAWINGS

FIG. 3 is a view showing engaged states of clutches and brakes for respective shift speeds in the automatic transmission.

MODES FOR CARRYING OUT THE INVENTION

Figure 1:
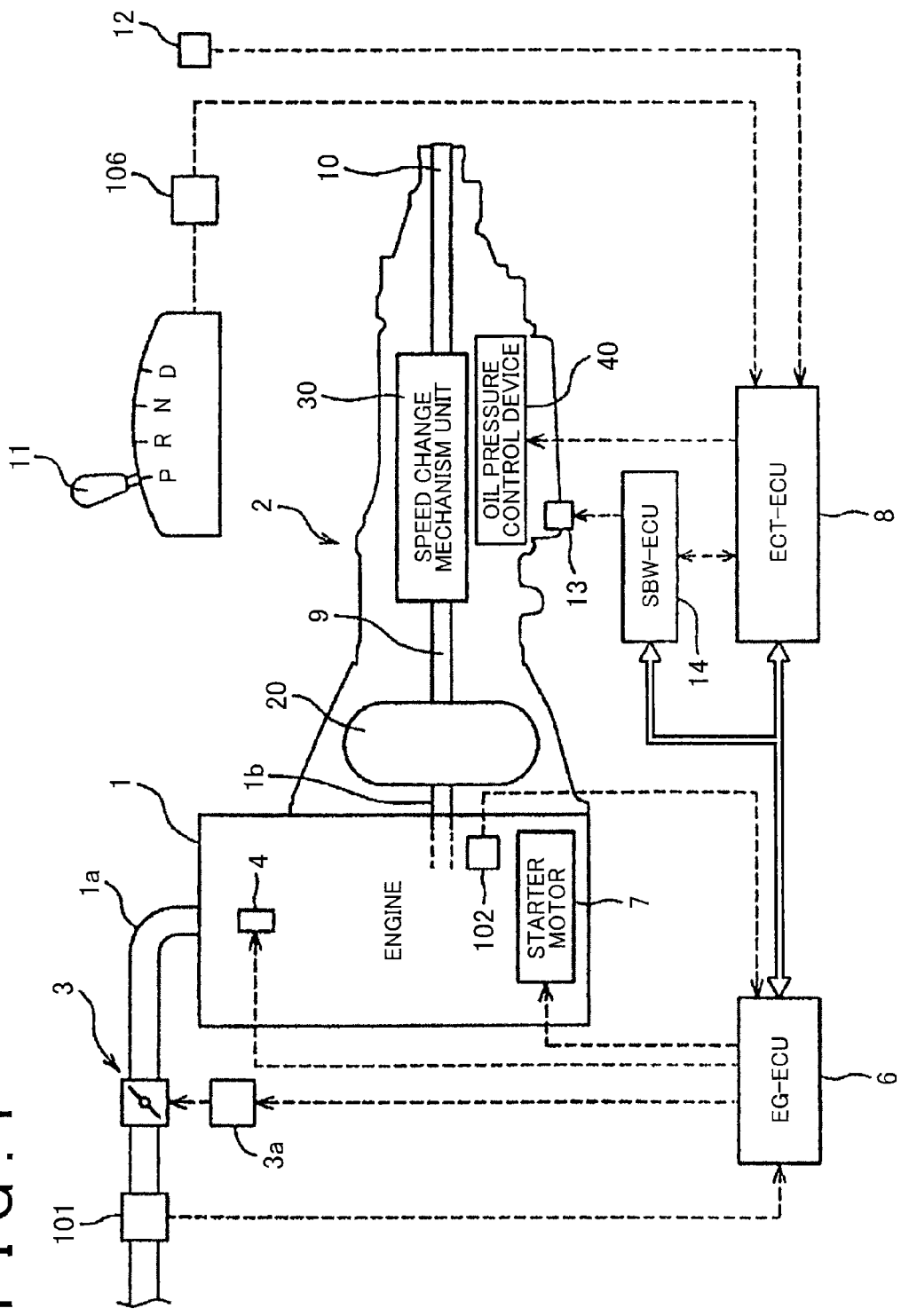
FIG. 1 is a schematic block diagram of a power train of a vehicle according to an embodiment of the invention.

An embodiment of the invention will be described hereinafter based on the drawings. In the present embodiment of the invention, a case where the invention is applied to a front-engine rear-drive (FR) vehicle that is mounted with an automatic transmission will be described. First of all, FIG. 1 shows the overall configuration of a power train of a vehicle. In this drawing, an engine is denoted by a reference numeral 1, and the automatic transmission is denoted by a reference numeral 2.

Engine

The engine 1 is, for instance, a multi-cylinder gasoline engine. The opening degree of a throttle valve 3 that adjusts the flow rate of air (intake air) flowing through an intake passage 1a is adjusted independently of the operation of depressing an accelerator pedal by a occupant. The opening degree of the throttle valve 3 is adjusted based on, for example, an accelerator operation amount, a condition associated with control, and the like. An airflow meter 101 that measures an intake air amount is disposed in the intake passage 1a.

Besides, the engine 1 is equipped with an injector 4 for supplying fuel to each of cylinders. The amount of the fuel injected by this injector 4 is adjusted such that an air-fuel ratio suited for the foregoing intake air amount is obtained. The mixture of the fuel thus injected and air burns in each of the cylinders, and a piston is depressed, so a crankshaft 1b of the engine 1 rotates. A crank angle sensor 102 is provided to detect a rotational speed of this crankshaft 1b (an engine rotational speed Ne).

Signals from the airflow meter 101, the crank angle sensor 102 and the like are input to an engine ECU (an electronic control unit: hereinafter referred to as an EG-ECU 6. In response to the inputting of these signals, the EG-ECU 6 outputs a command signal to an actuator 3a of the throttle valve 3, and controls the throttle opening degree such that a target intake air amount is obtained. Incidentally, the target intake air amount is determined in accordance with the engine rotational speed Ne, an accelerator operation amount, and the like.

Although not shown in detail in the drawing, the EG-ECU 6 has a general configuration including a CPU, a ROM, a RAM, a backup RAM, and the like, and is connected to an ECT-ECU 8 and an SBW-ECU 14, which will be described later, such that necessary information can be transmitted/received to/from each other in a bidirectional manner. Various programs for operation control of the engine 1, maps that are referred to when those programs are executed, and the like are stored in the ROM of the EG-ECU 6.

Besides, the engine 1 is equipped with a starter motor 7 that forcibly rotates (cranks) the crankshaft 1b in starting up the engine 1, and operates upon being supplied with electric power from an in-vehicle battery (not shown). In the present embodiment of the invention, when the engine is restarted after being automatically stopped through idling stop control, the starter motor 7 is operated upon receiving a command signal from the EG-ECU 6, as will be described later in detail.

Automatic Transmission

The automatic transmission 2 changes the speed of a rotational motive power input from the engine 1, and outputs the motive power to driving wheel sides from an output shaft 10. The automatic transmission 2 is mainly equipped with a torque converter 20, a speed change mechanism unit 30, an oil pressure control circuit 40, and the like. As exemplified in FIG. 2, the torque converter 20 is equipped with an input-side pump impeller 21, an output-side turbine runner 22, a stator 23 that performs the function of torque amplification, and a one-way clutch 24, and transmits motive power between the pump impeller 21 and the turbine runner 22 via a fluid.

Besides, the torque converter 20 is also provided with a lockup clutch 26 that directly couples the input-side pump impeller 21 and the output-side turbine runner 22 to each other. The lockup clutch 26 is changed over, according to need, to an engaged state where the pump impeller 21 and the turbine runner 22 are directly coupled to each other, a released state where the pump impeller 21 and the turbine runner 22 are decoupled from each other, or a half-engaged state that is located in the middle between this engaged state and this released state.

Figure 2:
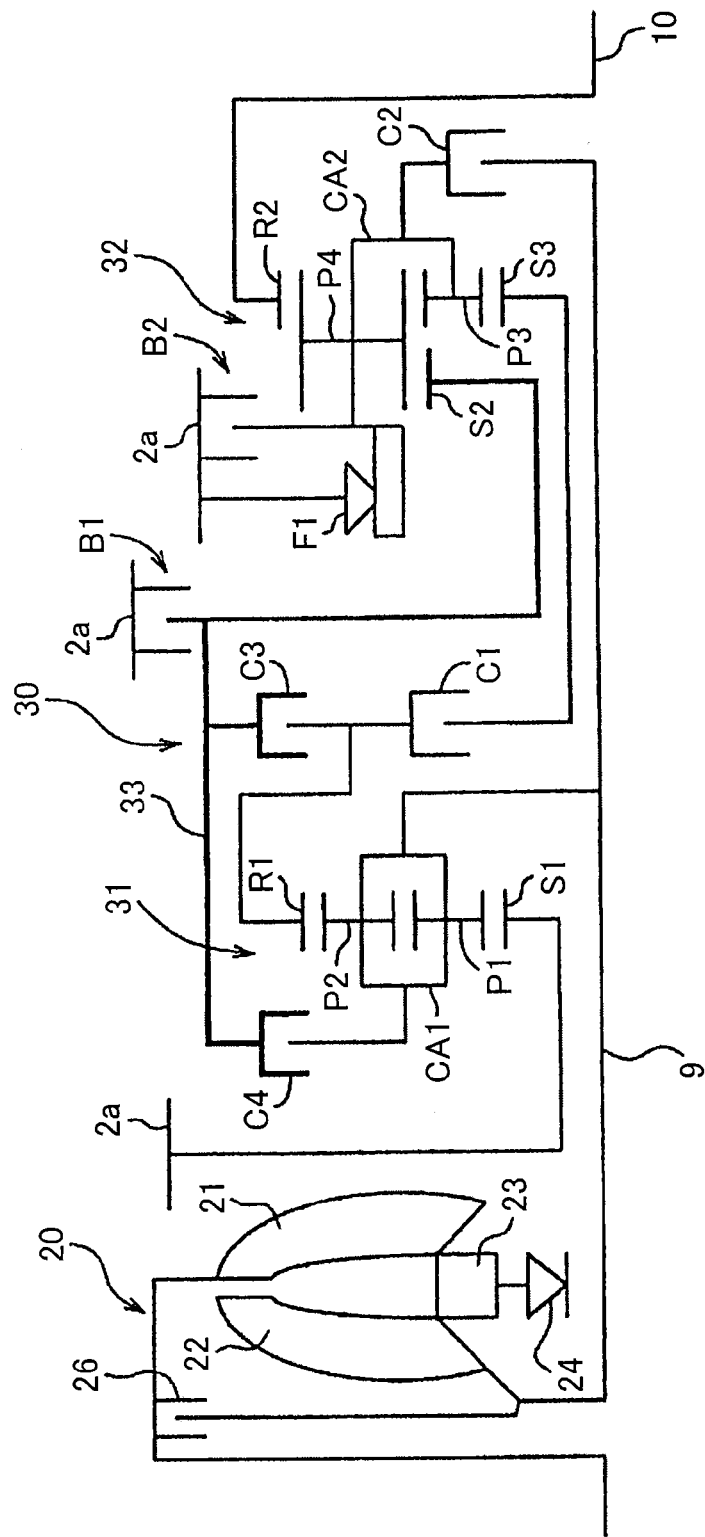
FIG. 2 is a skeleton view showing an example of a speed change mechanism unit in an automatic transmission.

The speed change mechanism unit 30 is a geared speed change mechanism that gradually changes the speed of a rotational motive power that is input from a turbine shaft of the torque converter 2 to an input shaft 9. As shown in FIG. 2, the speed change mechanism unit 30 is configured to include a front planetary gear unit 31, a rear planetary gear unit 32, an intermediate drum 33 as an intermediate rotor, first to fourth clutches C1 to C4, and first and second brakes B1 and B2.

In the present embodiment of the invention, the front planetary gear unit 31 is of double pinion type, and is configured to include a first sun gear S1, a first ring gear R1, a plurality of inner pinion gears P1, a plurality of outer pinion gears P2, and a first carrier CA1. The first sun gear S1 is fixed to a case 2a, and cannot rotate. The first ring gear R1 is supported by the intermediate drum 33 via the third clutch C3, and is changed over to a state where the first ring gear R1 can rotate integrally with the intermediate drum 33 or a state where the first ring gear R1 can rotate relatively to the intermediate drum 33, by this third clutch C3. The sun gear S1 is concentrically inserted radially inward of the first ring gear R1.

Besides, the plurality of the inner pinion gears P1 and the plurality of the outer pinion gears P2 are interposed in an annual space between the first sun gear S1 and the first ring gear R1, while being spaced apart from each other in a circumferential direction. While the respective inner pinion gears P1 are meshed with the first sun gear S1, the respective outer pinion gears P2 are meshed with the inner pinion gear P1 and the first ring gear R1.

The first carrier CA1 rotatably supports both the pinion gears P1 and P2, and has a central shaft portion that is integrally coupled to the input shaft 9. Respective support shaft portions of the first carrier CA1 that support both the pinion gears P1 and P2 are changed over to a state where the first carrier CA1 can rotate integrally with the intermediate drum 33 or a state where the first carrier CA1 can rotate relatively to the intermediate drum 33, by the fourth clutch C4. The intermediate drum 33 is rotatably arranged radially outward of the first ring gear R1, and is supported by the case 2a via the first brake B1 in a non-rotatable state or a relatively rotatable state.

On the other hand, the rear planetary gear unit 32 is of Ravigneaux type, and is configured to include a second sun gear S2 with a large diameter, a third sun gear S3 with a small diameter, a second ring gear R2, a plurality of short pinion gears P3, a plurality of long pinion gears P4, and a second carrier CA2. The second sun gear S2 is coupled to the intermediate drum 33. The third sun gear S3 is integrally rotatably or relatively rotatably coupled to the first ring gear R1 of the front planetary gear unit 31 via the first clutch C1. The second ring gear R2 is integrally coupled to the output shaft 10.

Besides, the plurality of the short pinion gears P3 are meshed with the third sun gear S3. The plurality of the long pinion gears P4 are meshed with the second sun gear S2 and the second ring gear R2, and are meshed with the third sun gear S3 via the short pinion gears P3. Furthermore, the second carrier CA2 rotatably supports the plurality of the short pinion gears P3 and the plurality of the long pinion gears P4, and has a central shaft portion that is coupled to the input shaft 9 via the second clutch C2. Respective support shaft portions of this second carrier CA2 that support the respective pinion gears P3 and P4 are supported by the case 2a via the second brake B2 and the one-way clutch F1.

The first clutch C1 changes over the third sun gear S3 of the rear planetary gear unit 32 to an engaged state where the third sun gear S3 can rotate integrally with the first ring gear R1 of the front planetary gear unit 31 or a released state where the third sun gear S3 can rotate relatively to the first ring gear R1 of the front planetary gear unit 31. By the same token, the second clutch C2 changes over the second carrier CA2 of the rear planetary gear unit 32 to a state where the second carrier CA2 is engaged with the input shaft 9 or a state where the second carrier CA2 is released from the input shaft 9. The third clutch C3 changes over the first ring gear R1 of the front planetary gear unit 31 to a state where the first ring gear R1 is engaged with the intermediate drum 33 or a state where the first ring gear R1 is released from the intermediate drum 33. The fourth clutch C4 changes over the first carrier CA1 of the front planetary gear unit 31 to a state where the first carrier CA1 is engaged with the intermediate drum 33 or a state where the first carrier CA1 is released from the intermediate drum 33.

Besides, the first brake B1 changes over the intermediate drum 33 to an engaged state where the intermediate drum 33 cannot rotate with respect to the case 2a of the automatic transmission 2 or a released state where the intermediate drum 33 can rotate relatively to the case 2a of the automatic transmission 2. By the same token, the second brake B2 changes over the second carrier CA2 of the rear planetary gear unit 32 to a state where the second carrier CA2 is engaged with the case 2a or a state where the second carrier CA2 is released from the case 2a. The one-way clutch F1 allows the second carrier CA2 of the rear planetary gear unit 32 to rotate only in one direction.

Then, the foregoing first to fourth clutches C1 to C4 and the foregoing first and second brakes B1 and B2 are all designed as wet multiple-disc frictional engagement elements. These frictional engagement elements are individually engaged and released upon receiving an oil pressure supplied from the oil pressure control circuit 40, so a suitable shift speed (first to eighth forward shift speeds and a backward shift speed) is established. For instance, an engagement table of FIG. 3 shows how engaged or released states of the foregoing clutches C1 to C4, the foregoing brakes B1 and B2, and the foregoing one-way clutch F1 are related to the respective shift speeds. In this engagement table, a circle represents "an engaged state", a cross represents "a released state", a double circle represents "an engaged state at the time of engine brake", and a triangle represents "an engaged state only at the time of driving".

The basic configuration of the oil pressure control circuit 40 is known, so detailed diagrammatic representation and explanation thereof will be omitted herein. However, the oil pressure control circuit 40 is configured to include a pressure control unit that adjusts the oil pressure generated in an oil pump to a predetermined line pressure, and a plurality of solenoid valves, control valves and the like for appropriately engaging or releasing the clutches C1 to C4 and the brakes B1 and B2 of the speed change mechanism unit 30 by adjusting the oil pressures applied thereto as described above. Incidentally, an electric oil pump is also provided in addition to the mechanical oil pump. At the time of idling stop as will be described later, the electric oil pump is driven.

Then, a command signal output from the transmission ECU (the electronic controlled transmission-ECU: hereinafter referred to as the ECT-ECU) 8 is input to the foregoing solenoids and the like. This ECT-ECU 8 also has a known configuration similar to that of the foregoing EG-ECU 6. The ECT-ECU 8 includes a CPU, a ROM, a RAM, a backup RAM, and the like, and controls the solenoid valves and the like of the oil pressure control circuit 40 in accordance with the driving state of the vehicle, the accelerator operation amount, and the like.

Besides, the oil pressure control circuit 40 is equipped with a manual valve 42 (see FIG. 4) for changing over the range of the automatic transmission 2 (e.g., the neutral range (N), a forward running range (D), a backward running range (R), or the parking range (P)). For instance, the manual valve 42 is a known spool valve. The manual valve 42 supplies a line pressure to the foregoing solenoid valves and the foregoing control valves, and allows an engagement oil pressure to be supplied to the clutches C1 to C4 and the brakes B1 and B2 via these valves.

More specifically, the manual valve 42 is slid to each of positions "P", "R", "N", and "D" by a later-described range changeover mechanism 13, in a manner corresponding to a target range that is selected through the operation of the shift lever 11 or a parking switch 12 by the occupant of the vehicle. That is, a target range signal is output from a shift lever position sensor 106 in a manner corresponding to the target range (P, R, N, or D) selected by the shift lever 11. The SBW-ECU 14, which has received this signal via the ECT-ECU 8, operates the range changeover mechanism 13 as will be described below.

The SBW-ECU 14, namely, the shift-by-wire ECU 14 is configured to include a CPU, a ROM, a RAM, a backup RAM, and the like, as is the case with the EG-ECU 6 and the ECT-ECU 8. The SBW-ECU 14 recognizes an actual range by a range position signal that is output from a range position sensor 103 (see FIG. 4) in a manner corresponding to each of the positions (P, R, N, or D) of the manual valve 42, and operates the range changeover mechanism 13 such that this actual range becomes the target range (which is recognized by the target range signal from the shift lever position sensor 106).

Incidentally, the range position sensor 103 may be, for example, a known neutral start switch. The neutral start switch detects a rotational angle of a manual shaft 15a of the range changeover mechanism 13, which will be described below. This rotational angle is correlated with the position (P, R, N, or D) of the manual valve 42 that is interlocked with a detent plate 15. Therefore, the position (P, R, N, or D) of the manual valve 42 can be detected by detecting this rotational angle.

Range Changeover Mechanism

Figure 4:
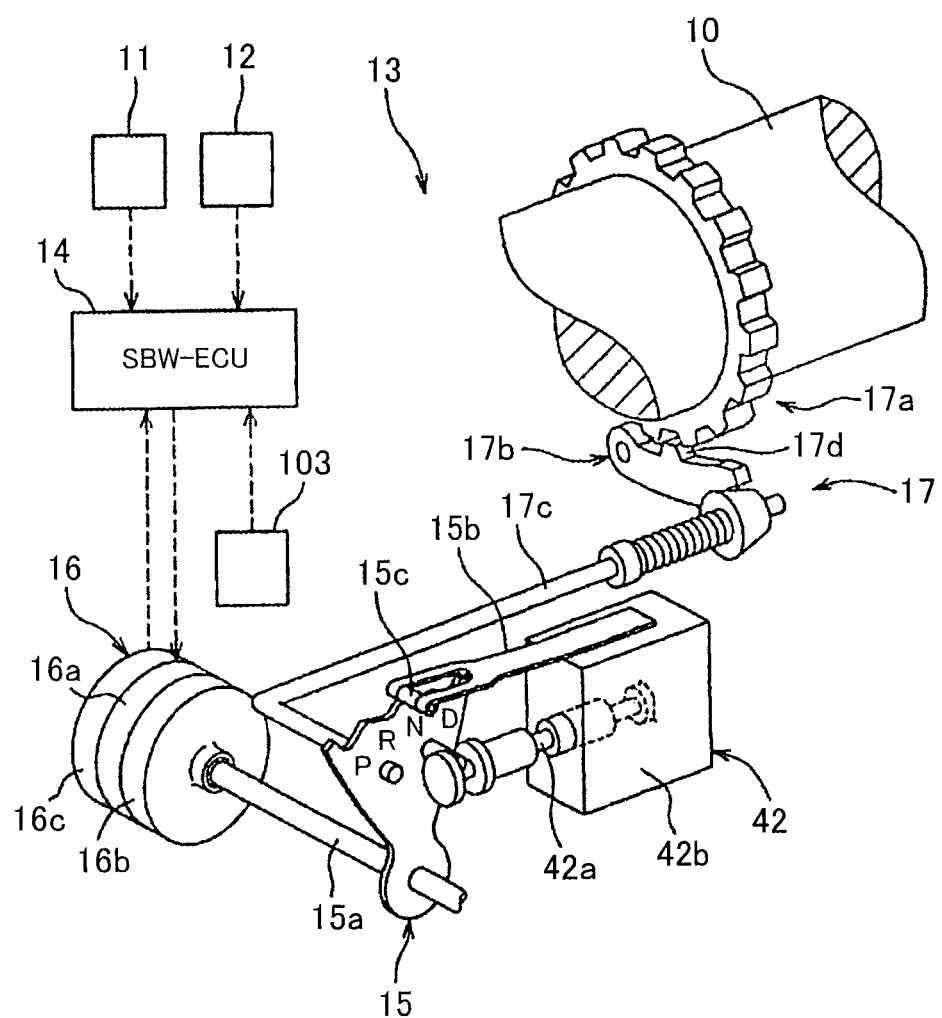
FIG. 4 is a perspective view showing an example of a range changeover mechanism of the automatic transmission.

As exemplified in FIG. 4, the range changeover mechanism 13 according to the present embodiment of the invention is equipped with the detent plate 15 that is interlocked with a spool 42a of the manual valve 42 to hold this spool 42a in position, and a shift actuator 16 for tilting this detent plate 15. Besides, in the present embodiment of the invention, a parking mechanism 17 is integrated with the range changeover mechanism 13. The shift actuator 16 is electrically operated, and is supplied with electric power from the same in-vehicle battery as of the starter motor 7.

The detent plate 15 is tilted by the shift actuator 16, gradually pushes and pulls the spool 42a of the manual valve 42 and a parking rod 17c of the parking mechanism 17, and holds them in position. A detent mechanism is configured to include the detent plate 15, the manual shaft 15a, and a detent spring 15b. Incidentally, in the example shown in the drawing, the detent spring 15b is supported by a valve body 42b of the manual valve 42.

More specifically, the detent plate 15 assumes the shape of a fan. The manual shaft 15a is fixed in such a state as to substantially perpendicularly penetrate a region serving as a tilt (rotation) center of the detent plate 15. The detent plate 15 is rotated by the shift actuator 16. A waveform portion is formed on an outer periphery of the detent plate 15. A roller 15c of the detent spring 15b is fitted in one of valleys of the waveform portion, and is held in position.

Figure 5A:
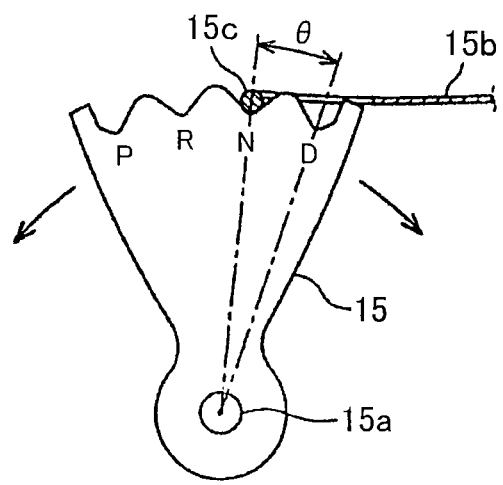
FIG. 5A is an enlarged view of a detent plate of the range changeover mechanism, and shows a state of a neutral range.
Figure 5B:
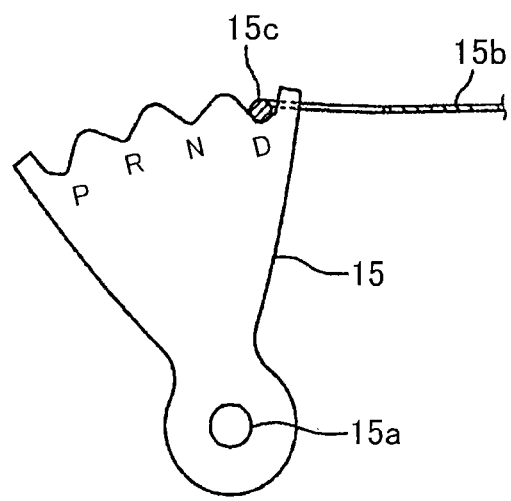
FIG. 5B is a view equivalent to FIG. 5A, and shows a state of a forward running range.

More specifically, as shown in FIG. 5 on an enlarged scale, there are four valleys arranged on the waveform portion of the outer periphery of the detent plate 15, in a manner corresponding to the respective positions (P, R, N, and D) of the manual valve 42 that is interlocked therewith. Then, the roller 15c of the detent spring 15b is fitted in one of the four valleys (in the valley "N" in FIG. 5A, or in the valley "D" in FIG. 5B). Thus, the detent plate 15 is held in position in such a manner as to correspond to each of the positions of the manual valve 42 ("N" in FIG. 5A, and "D" in FIG. 5B).

The shift actuator 16 includes an electric motor 16a, a deceleration mechanism 16b that decelerates rotation thereof, and an encoder 16c. An output shaft (not shown) of this deceleration mechanism 16b is integrally rotatably coupled to the foregoing manual shaft 15a through, for example, spline fitting. Incidentally, the parking mechanism 17 changes over the output shaft 10 of the automatic transmission 2 to a locked state where the output shaft 10 cannot rotate or an unlocked state where the output shaft 10 can rotate. The parking mechanism 17 is configured to include a parking gear 17a that is mounted on the output shaft 10, a parking lock pawl 17b, and the parking rod 17c.

Next, the basic operation of the foregoing range changeover mechanism 13 will be described. First of all, the occupant of the vehicle manually operates the shift lever 11 or the parking switch 12, so one of the parking range (P), a reverse range (R), the neutral range (N), a drive range (D), and the like of the automatic transmission 2 is selected. Signals are output from the shift lever position sensor 106 and the parking switch 12 in accordance with this selection.

Upon receiving these signals, the SBW-ECU 14 recognizes the foregoing selected target range (P, R, N, or D), and positively or reversely rotates the output shaft of the shift actuator 16 by a predetermined angle (i.e., an angle equivalent to a clearance between any ones of the valleys on the outer periphery of the detent plate 15, that is, θ, 2×θ, or 3×θ in FIG. 5A). Thus, the manual shaft 15a and the detent plate 15 are tilted by the foregoing predetermined angle.

For instance, when an operation from the neutral range (N) to the forward running range (D) is performed through the use of the shift lever 11, the target range signal changes from N to D. The SBW-ECU 14 that has received this signal sets a target rotational angle (θ in FIG. 5A) corresponding to the selected target range (D), and starts energizing the electric motor 16a. Then, a signal equivalent to a rotor rotational angle of the electric motor 16a is input from the encoder 16c, and the electric motor 16a is controlled through feedback such that this rotor rotational angle coincides with the foregoing target rotational angle.

Figure 5C:
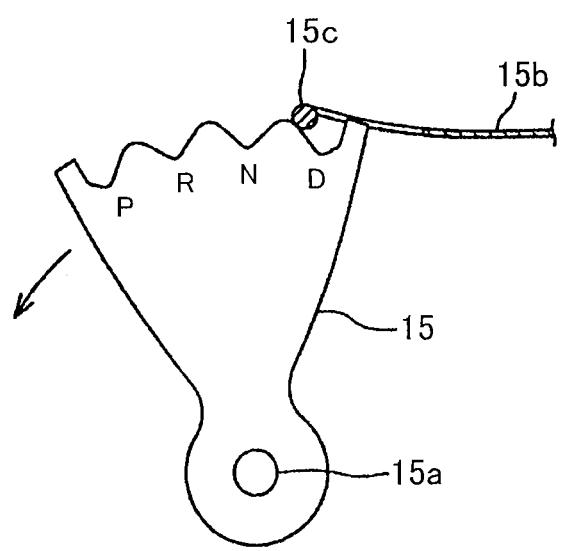
FIG. 5C is a view equivalent to FIG. 5A, and shows a process of a changeover from the neutral range to the forward running range.

Owing to this control of the electric motor 16a, the detent plate 15 tilts by the angle θ from a state of FIG. 5A counterclockwise in the drawing. The roller 15c of the detent spring 15b is pushed out of the valley "N", moves beyond a mountain as shown in FIG. 5C, and is fitted into the adjacent valley "D" as shown in FIG. 5B. As a result of this, the spool 42a of the manual valve 42 is slid in an axial direction although not shown in the drawing, so the range of the manual valve 42 is changed over from N to D.

Incidentally, in the case where the parking range (P) has been selected through manual operation of the parking switch 12 by the occupant, the parking rod 17c is pushed as the detent plate 15 tilts. Then, the parking lock pawl 17b is lifted, and a pawl 17d thereof is engaged into a space between gear teeth of the parking gear 17a. Thus, the output shaft 10 of the automatic transmission 2 becomes unable to rotate, and the manual valve 42 stops at the position "P", so all the clutches C1 to C4 and all the brakes B1 and B2 are released.

Control in Restarting Engine

If a predetermined condition is fulfilled when the vehicle according to the present embodiment of the invention is stopped, the engine 1 is automatically stopped (so-called idling stop). When a predetermined operation of the shift lever 11 is then performed by the occupant, the engine 1 is automatically restarted. In this case, it is also conceivable to operate the range changeover mechanism 13 as well upon the start of cranking, so that the vehicle can immediately start when the start-up of the engine 1 is completed.

However, when an attempt is then made to start the operation of the starter motor 7 for cranking and immediately operate the shift actuator 16 of the range changeover mechanism 13 as well, the operation of the shift actuator 16 may become slow or unstable due to a fall in battery voltage.

Figure 9:
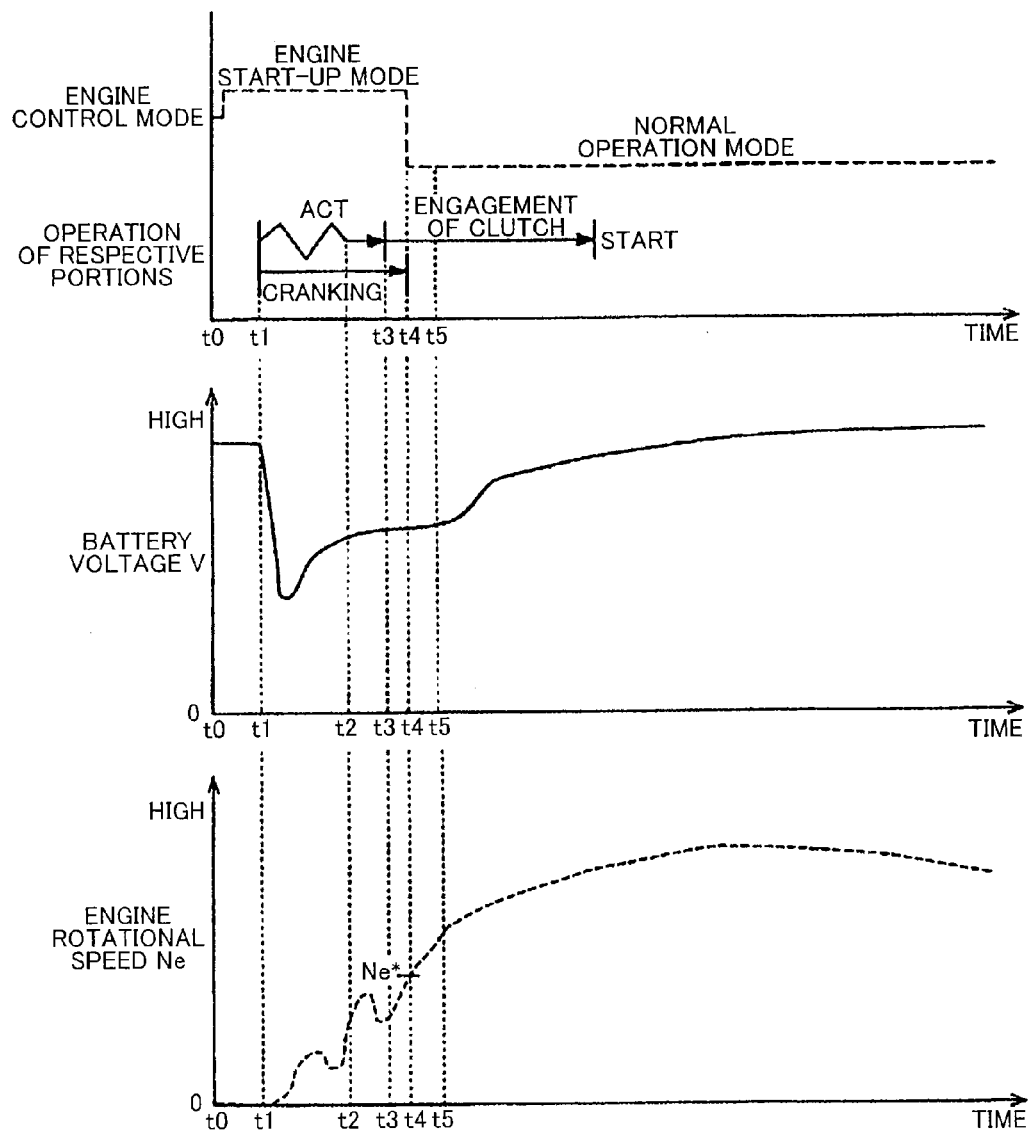
FIG. 9 is a view equivalent to FIG. 7 in a case where a range is changed over substantially simultaneously with cranking.

Concretely, as exemplified in FIG. 9, when cranking is started in response to the operation by the occupant of the vehicle (at a time t0) (in an engine start-up mode: from a time t1), the engine rotational speed Ne starts rising, and at the same time, a voltage V of the battery rapidly falls (from the time t1 to a time t2). Due to the influence of this fall in voltage, the operation of the electric shift actuator 16 (i.e., the operation of the electric motor 16a) becomes unstable as schematically indicated by a zigzag line ACT in the drawing. It may even be determined that a failure has occurred, when the voltage has excessively fallen.

Besides, as is apparent from the drawing, while the rotational speed Ne of the engine 1 that has completely exploded (at a time t4) after cranking further rises (from the time t1 to a time t5), the operation of changing over the range of the automatic transmission 2 is completed (at a time t3), and the manual valve 42 changes over to the forward running range (D). Therefore, due to application of the increasing discharge pressure of the oil pump at once, the first clutch C1 of the speed change mechanism unit 30 is suddenly engaged, so a shock may be caused.

Furthermore, when the first clutch C1 is thus coupled suddenly, the racing turning force of the engine 1 is amplified by the torque converter 20, is suddenly input to the speed change mechanism unit 30, and is transmitted from the output shaft 10 to the driving wheel sides. Therefore, the occupant feels as if the vehicle were jumping out, so there is also a concern over a decrease in driveability.

Thus, according to the present embodiment of the invention, first of all, the range changeover mechanism 13 is operated by the shift actuator 16 to change over the range of the automatic transmission 2 to the forward running range (D). After the completion of this changeover operation, the operation of the starter motor 7 is started, so a fall in battery voltage does not affect the operation of the shift actuator 16. In this manner, the operation of changing over the range of the automatic transmission 2 can be stabilized, and the occurrence of a shock and a decrease in driveability can be suppressed, while enhancing the starting responsiveness of the vehicle.

Figure 6:
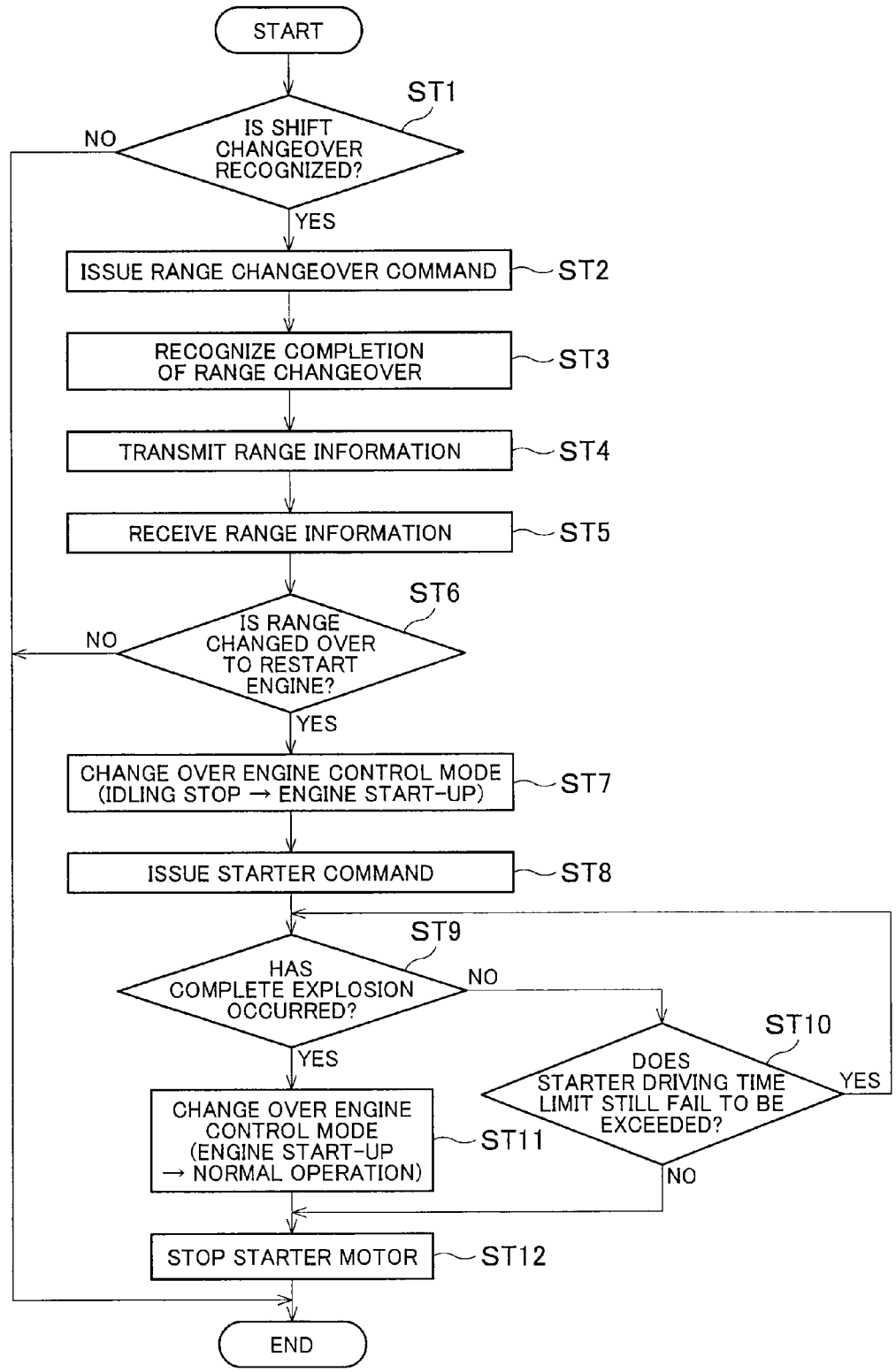
FIG. 6 is a flowchart showing a control routine of a changeover of the range of the automatic transmission and engine start-up.

A control routine of range changeover and engine start-up, which is executed by the SBW-ECU 14 and the EG-ECU 6 in cooperation with each other, will be described hereinafter concretely with reference to a flowchart shown in FIG. 6. This control routine is executed on a certain cycle (e.g., at intervals of about several milliseconds to several dozens of milliseconds) during idling stop of the vehicle.

In step S1 after the start of the control routine shown in the drawing, the SBW-ECU 14 to which a signal from the shift lever position sensor 106 has been input recognizes whether or not a shift changeover has been made, namely, whether or not the target range has been changed over through the operation of the shift lever 11 by the occupant. Then, if the changeover of the target range is not recognized and the result of the determination is negative (NO), the control routine is temporarily ended (end).

On the other hand, if the changeover of the target range is recognized and the result of the determination is positive (YES), the SBW-ECU 14 outputs a command signal (a range changeover command) equivalent to a target rotational angle corresponding to a selected target range to the shift actuator 16 of the range changeover mechanism 13 (step ST2). Upon receiving this command signal, the shift actuator 16 operates, and the detent plate 15 of the range changeover mechanism 13 is tilted (turned), so the position (P, R, N, or D) of the manual valve 42 is changed over to the selected target range.

At this time, as described above with reference to FIGS. 5A to 5C, the roller 15*c* of the detent spring 15*b* moves relatively to the waveform portion of the tilting detent plate 15, is pushed out from one of the valleys of the waveform portion, moves past one or two or more of the mountains, and then is fitted into the valley corresponding to the target range. Then, a range position signal corresponding to a position of the detent plate 15 (a rotational angle of the manual shaft 15*a*) at that time is output from the range position sensor 103.

The SBW-ECU 14, which has recognized the actual range upon receiving this range position signal, recognizes the completion of range changeover if the actual range is the same as the target range (step ST3). Then, a signal of range information indicating the actual range position after the completion of changeover is output to the EG-ECU 6 (step ST4).

That is, in the present embodiment of the invention, the shift actuator 16 of the range changeover mechanism 13 is first operated by the SBW-ECU 14 in response to the operation of the shift lever 11 by the occupant, and the operation of changing over the range is thereby completed. Then, after the position of the manual valve 42 is changed over to the target range, the EG-ECU 6 is provided with the information (range information).

On the other hand, the EG-ECU 6 receives a signal of the range information transmitted from the SBW-ECU 14 as described above (step ST5), and determines, from this range information, whether or not a range operation for restarting the engine 1 has been performed (step ST6). For example, if a changeover operation from the parking range (P) or the neutral range (N) to the forward running range (D) or the backward running range (R), or a changeover operation from the forward running range (D) to the neutral range (N) and then to the forward running range (D) is performed, the result of the determination is positive (YES). If a changeover operation other than those is performed, the result of the determination is negative (NO), and the control routine is temporarily ended.

A changeover from the neutral range (N) to the forward running range (D) will be described hereinafter as an example. However, the same holds true even if a changeover other than that is made as long as the engine 1 is restarted.

That is, first of all, if a changeover operation from the neutral range (N) to the forward running range (D) is performed, the result of the determination in the step ST6 is positive (YES), and an advance to step ST7 is made. Then, the EG-ECU 6 changes over the control mode of the engine 1 from an idling stop mode to the engine start-up mode. Subsequently in step ST8, the EG-ECU 6 outputs a command signal (a starter command) to the starter motor 7.

Thus, the operation of the starter motor 7 is started, and the cranking of the engine 1 is started. Although not shown in the drawing, the EG-ECU 6 also starts the control of fuel injection and ignition, so the mixture burns in cylinders, and the engine rotation races. Thus, it is determined whether or not the engine rotational speed Ne has exceeded a predetermined criterial rotational speed Ne* (whether or not complete explosion has occurred) (step ST9). If the result of the determination is negative (NO), an advance to step ST10 is made. If a predetermined starter drive time limit still fails to be exceeded, the result of the determination is positive (YES), and a return to the step ST8 is made.

On the other hand, if the engine rotational speed Ne has exceeded the criterial rotational speed Ne* and the result of the determination in step ST9 is positive (YES), an advance to step ST11 is made. Then, the EG-ECU 6 changes over the engine control mode from the engine start-up mode to a normal operation mode. After stopping the starter motor 7 in step ST12, the EG-ECU 6 ends the control routine (end). Incidentally, if it is not determined in the foregoing step ST9 that complete explosion has occurred and the starter drive time limit is exceeded in step ST10, the result of the determination is negative (NO), and an advance to the step ST12 is made. Then, the starter motor 7 is stopped, and the control routine is ended (end).

According to the control in restarting the engine as described above, as exemplified in the time chart of FIG. 7, when the engine 1 that has carried out idling stop is restarted, the range of the automatic transmission 2 is first changed over, and the cranking of the engine 1 is started after the completion thereof. For example, when the occupant of the vehicle operates the shift lever 11 (at the time t0) and the forward running range (D) is selected as the target range in the case of idling stop in the neutral range (N), the SBW-ECU 14 receives a target range signal output from the shift lever position sensor 106 and then recognizes a shift changeover (at the time t1).

Then, upon receiving a command signal from the SBW-ECU 14, the shift actuator 16 of the range changeover mechanism 13 operates (ACT: from the time t1), the detent plate 15 tilts, and the position (P, R, N, or D) of the manual valve 42 is changed over to the forward running range (D) (at the time t2). Thus, the SBW-ECU 14 receives the range position signal output from the range position sensor 103, and transmits information on the completion of range changeover to the EG-ECU 6.

In the EG-ECU 6 that has received this information, the engine control mode is changed over from the idling stop mode to the engine start-up mode (at the time t3). After the lapse of a predetermined waiting time, a command signal (a starter command) is output from the EG-ECU 6 to the starter motor 7 (at the time t4), and the starter motor 7 starts operation. That is, the cranking of the engine 1 is started.

Figure 7:
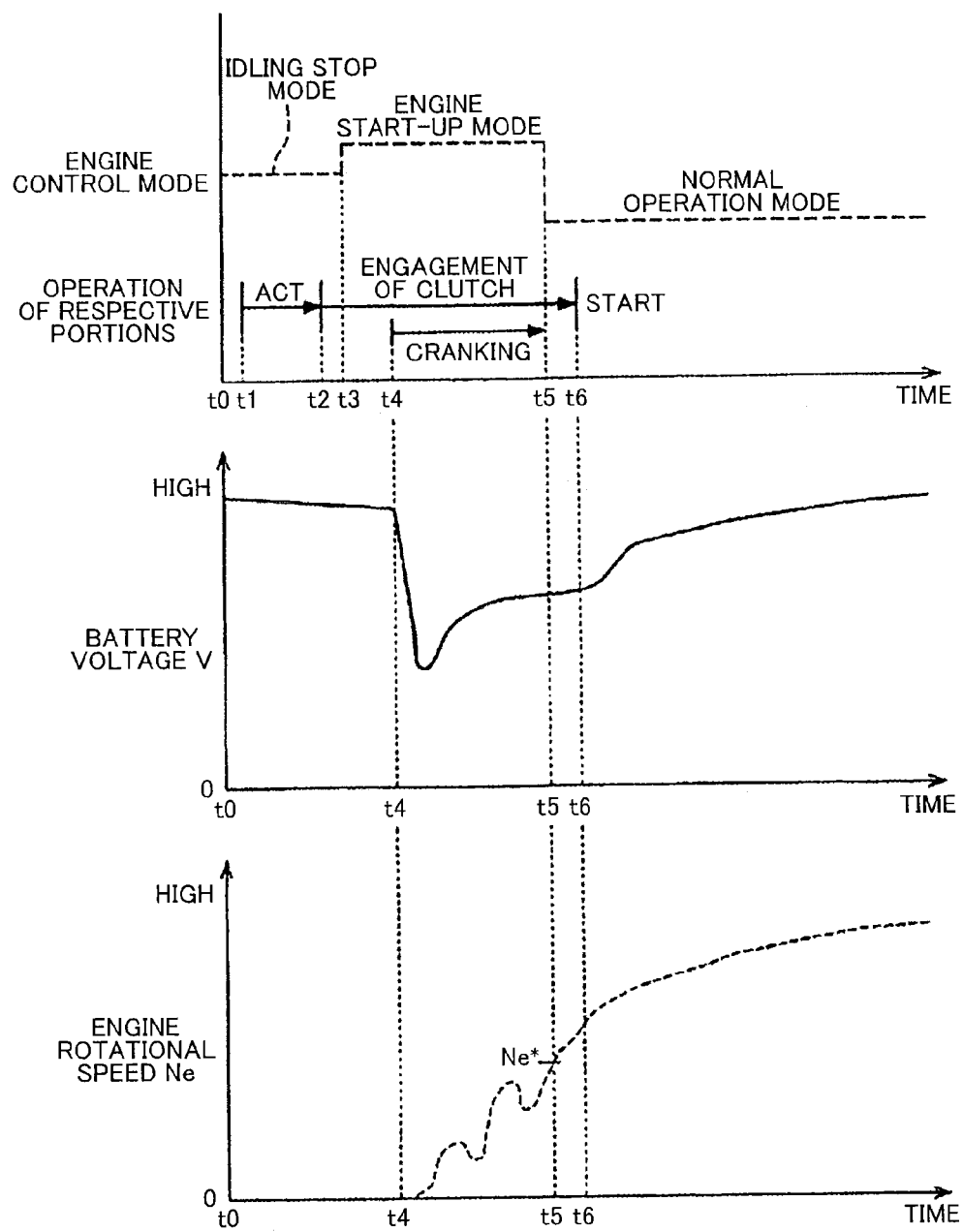
FIG. 7 is a timing chart showing the operation of a shift actuator or the like for changing over a range, a fall in battery voltage resulting from start-up, and a rise in engine rotational speed.
Figure 8:
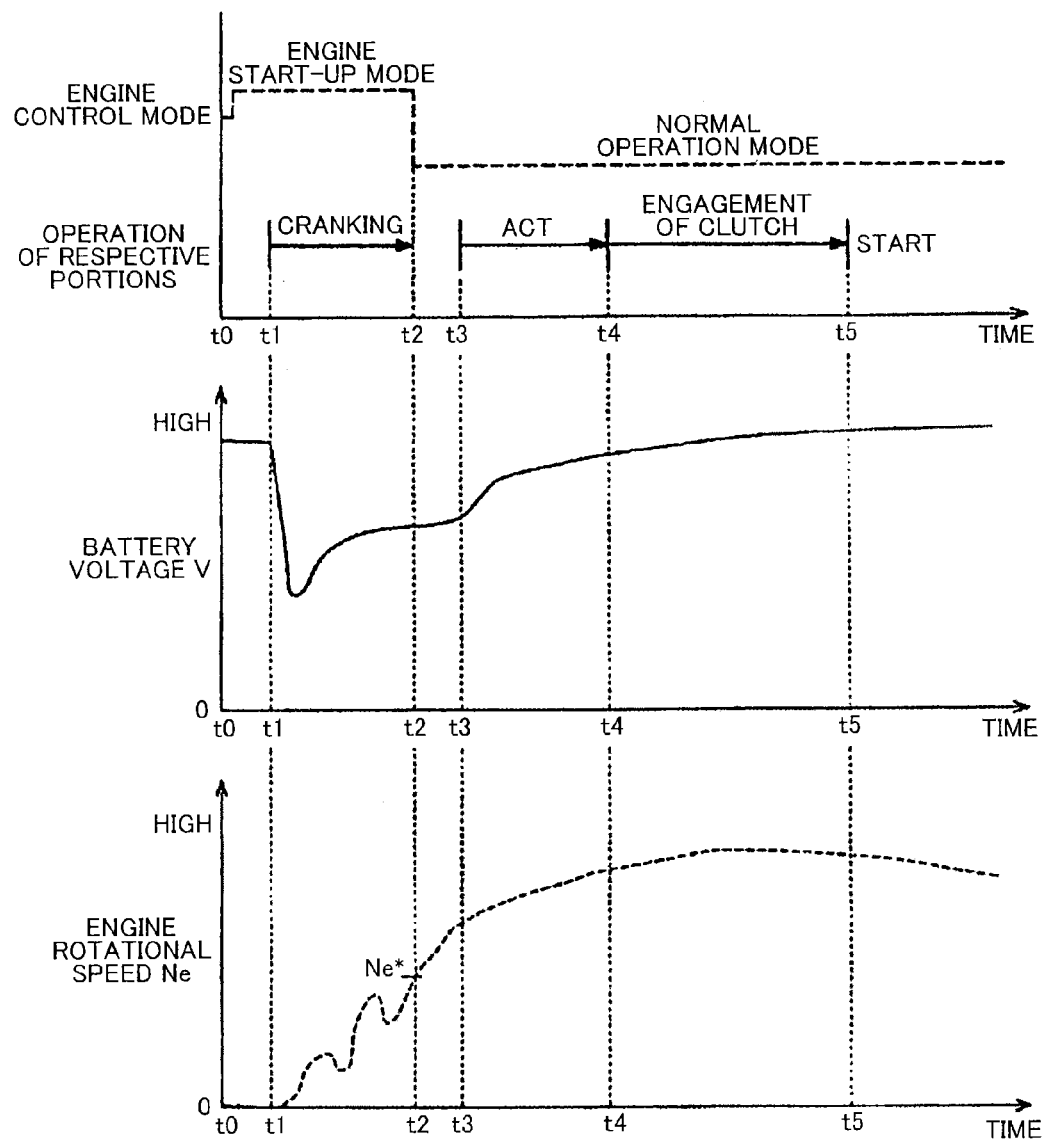
FIG. 8 is a view equivalent to FIG. 7 according to a conventional example in which a range is changed over after the engine is started up.

As a result of the start of the operation of this starter motor 7 (the start of cranking), the battery voltage V rapidly falls as shown in FIG. 7. However, since the operation of the shift actuator 16 has already been completed at this time, the operation thereof, namely, the operation of the range changeover mechanism 13 does not adversely affect the changeover of the range of the automatic transmission 2.

Then, after cranking, when the racing rotational speed Ne of the engine 1 exceeds the criterial rotational speed Ne* upon the start of autonomous operation (at the time t5), the start-up of the engine 1 is completed, and the engine control mode is changed over from the engine start-up mode to the normal operation mode in the EG-ECU 6. In the example shown in the drawing, engagement control of the first clutch C1 of the speed change mechanism unit 30 is executed by the ECT-ECU 8 in parallel with such start-up of the engine 1. When this engagement control is also completed and the first clutch C1 is engaged (at a time t6), the vehicle starts.

In consequence, with the control apparatus for the vehicle according to the present embodiment of the invention, when the occupant of the vehicle that has carried out idling stop operates the shift lever 11 to make a changeover, for example, from a non-running range (P or N) to a running range (D or R), the range changeover mechanism 13 operates to change over the range of the automatic transmission 2 to the running range, and the cranking of the engine 1 is started by the starter motor 7. That is, the changeover of the range of the automatic transmission 2 and the start-up of the engine 1 are executed in response to the single shift operation, so the vehicle becomes ready to start.

In this case, cranking is started after the completion of the changeover of the range of the automatic transmission 2 after the lapse of a predetermined period since the start of the operation of the electric shift actuator 16 of the range changeover mechanism 13. Therefore, even when the battery voltage V rapidly falls as a result of the start of the operation of the starter motor 7, there is no apprehension that the operation of the shift actuator 16 (i.e., the operation of changing over the range) may be thereby adversely affected.

In consequence, in comparison with a case where the range of the automatic transmission 2 is changed over after the completion of the start-up of the engine 1 as in the conventional example described in Patent Document 1, the adverse effect resulting from a fall in the battery voltage V can be eliminated, and the operation of changing over the range of the automatic transmission 2 can be stably ensured, while enhancing the starting responsiveness of the vehicle.

Besides, the engine rotational speed Ne that races during start-up rapidly rises after the completion of the changeover of the range of the automatic transmission 2, and the rising discharge pressure of the oil pump is gradually applied to the first clutch C1 of the speed change mechanism unit 30. Therefore, the occurrence of a clutch engagement shock and a decrease in driveability can be suppressed.

Furthermore, in the present embodiment of the invention, the completion of the operation of changing over the range as described above is recognized according to the signal from the range position sensor 103 (the range position signal). Therefore, an advantage is gained in obtaining the technical operation and effect as described above. It should be noted, however, that the operation of the starter motor 7 may be delayed not necessarily after the completion of the operation of changing over the range, but in short, for a while (until a predetermined period elapses) since the start of the operation of the shift actuator 16 for range change-over.

Concretely, as a modification example of the embodiment of the invention, the operation of the starter motor 7 may be delayed during a period to the attainment of a state where the range changeover mechanism 13 that is driven by the shift actuator 16 completes operation through inertia. The state where the range changeover mechanism 13 completes operation through inertia may be a state where the roller 15c of the detent spring 15b has moved past the mountain immediately preceding the valley corresponding to the target range at the waveform portion of the detent plate 15 as shown in, for example, FIG. 5C.

The reason for this is as follows. In the case where the operation of the starter motor 7 is delayed until this state is attained, even when the voltage of the battery rapidly falls as a result of the start of the operation thereof and the operation of the shift actuator 16 becomes slow or unstable, the roller 15c that has moved past the mountain of the waveform portion of the detent plate 15 is fitted into the valley through inertia due to a spring force of the detent spring 15b. As a result, the operation of the range change-over mechanism 13 is completed without any problem.

Besides, as another modification example, the operation of the starter motor 7 may be delayed at least until the end of the first half of the period from the start of the operation of the shift actuator 16 to the completion thereof. The reason for this is as follows. A relatively large current flows through the shift actuator 16 (the electric motor 16a) as well for a while since the start of the operation thereof. Therefore, if the battery voltage has rapidly fallen at this time, inconveniences tend to occur.

Other Embodiments

The description of the embodiment of the invention described above (including the modification examples thereof) is nothing more than exemplification, and is not intended to limit the configuration, use and the like of the invention. For example, in the foregoing embodiment of the invention and the like, it is determined from a signal from the range position sensor 103 (a range position signal) that the changeover of the range of the automatic transmission 2 has been completed or that a predetermined period has elapsed since the start of the operation of range changeover, but the invention is not limited thereto.

For example, it may be determined, based on a signal from an encoder 16c that detects a rotor rotational angle of the electric motor 16a of the shift actuator 16 (a sensor that detects an operation position of the shift actuator 16), that the operation of the shift actuator 16 has been completed, or that the predetermined period has elapsed since the start of the operation.

Besides, although not shown in the drawing, a sensor may be provided in such a manner as to detect a position of the spool 42a of the manual valve 42, and it may be determined, based on a signal from this sensor, that the operation of the range changeover mechanism 13 (in other words, the operation of the shift actuator 16) has been completed, or that the predetermined period has elapsed since the start of the operation.

Furthermore, it can also be determined that the operation of the shift actuator 16 has been completed or that the predetermined period has elapsed since the start of the operation, when a preset time has elapsed since the outputting of a command signal for causing the shift actuator 16

(the electric motor 16a) to start operation from the SBW-ECU 14. That is, it is appropriate to check a time when, for example, the detent plate 15 is tilted by the shift actuator 16 by a predetermined angle, and set a matching time in consideration of a response delay of control as well.

In this case, as exemplified in FIG. 5A, the tilt angle (3×θ) from the parking range (P) to the forward running range (D) is larger than the tilt angle (θ) of the detent plate 15 in the case where a changeover is made from the neutral range (N) to the forward running range (D), so the time required for tilting differs as well. In consequence, different lengths of time are preferably set in accordance with the relationship between the range before the changeover and the range after the changeover.

Besides, the changeover of the range of the automatic transmission 2 and the control of restart of the engine 1 may be executed in response to one, two or more operations by the occupant as well as the single operation of the shift lever for selecting the target range as in the foregoing embodiment of the invention. For example, in a configuration in which the engine is restarted as soon as the occupant removes his or her foot from a brake pedal, when the shift lever 11 is operated from a non-running range (P or N) to a running range (D or R) immediately prior thereto, the start of the operation of the starter motor 7 may be delayed, and the range of the automatic transmission 2 may be changed over first.

Still further, the invention is not limited either to the configuration in which the manual valve 42 of the oil pressure control circuit 40 is operated by the range changeover mechanism 13 as in the embodiment of the invention. The invention is also applicable to an automatic transmission that is configured such that the range thereof is changed over through the operation of a solenoid valve (which is equivalent to the electric shift actuator) in an oil pressure control circuit that does not have the manual valve 42.

Besides, the invention is not limited either to the configuration in which both the starter motor 7 and the shift actuator 16 are supplied with electric power from the same in-vehicle battery as in the embodiment of the invention. The invention is also applicable to a vehicle that is configured such that the starter motor 7 and the shift actuator 16 are supplied with electric power from different batteries.

Besides, in the foregoing embodiment of the invention and the like, the case where the invention is applied to the FR vehicle that is mounted with the automatic transmission 2 with eight forward speeds has been described as an example, but the invention is not limited thereto. The invention is also applicable to a vehicle that is mounted with an automatic transmission with five forward speeds, six forward speeds or the like, a front-engine front-drive (FF) vehicle, or a four-wheel-drive vehicle. Besides, the transmission may be configured as a continuously variable transmission (a CVT).

In addition, as for the driving force source of the vehicle as well, the invention is not limited to the gasoline engine as in the embodiment of the invention. The invention is also applicable to a vehicle that is mounted with another engine such as a diesel engine or the like. Besides, the invention is not limited either to a vehicle that is mounted with only an engine as a driving force source. For example, the invention is also applicable to a hybrid vehicle (a vehicle that is mounted with an engine and an electric motor as driving force sources).

INDUSTRIAL APPLICABILITY

The invention makes it possible to stably ensure the operation of changing over the range of the automatic transmission of shift-by-wire type, and to suppress the occurrence of a shock and a decrease in driveability as well, while enhancing the starting responsiveness of the vehicle. Therefore, the invention is especially effectively applicable to occupant vehicles that carry out idling stop.

DESCRIPTION OF REFERENCE NUMERALS

1 ENGINE
2 AUTOMATIC TRANSMISSION
6 EG-ECU
7 STARTER MOTOR
11 SHIFT LEVER
13 RANGE CHANGEOVER MECHANISM
14 SBW-ECU
16 SHIFT ACTUATOR
16c ENCODER (SENSOR FOR DETECTING OPERATION POSITION OF SHIFT ACTUATOR)
103 RANGE POSITION SENSOR (SENSOR FOR DETECTING OPERATION POSITION OF RANGE CHANGEOVER MECHANISM)

The invention claimed is:

1. A control apparatus for a vehicle, the vehicle including an engine, a battery, an electric shift actuator, an automatic transmission, and a starter motor, and the vehicle being configured such that the electric shift actuator and the starter motor are supplied with electric power from the same battery, the control apparatus comprising:
an electronic control unit configured to:
(i) change over a range of the automatic transmission through operation of the electric shift actuator;
(ii) start up the engine through operation of the starter motor; and
(iii) change over the range of the automatic transmission by operating the electric shift actuator in response to performance of a single operation of changing over the range of the automatic transmission from a non-running range to a running range by an occupant of the vehicle,
wherein the engine is started up by starting operation of the starter motor after a lapse of a predetermined period since start of operation of the electric shift actuator.

2. The control apparatus according to claim 1, wherein the predetermined period includes at least a first half of an operation period of the electric shift actuator.

3. The control apparatus according to claim 1, wherein the predetermined period is a period to attainment of a state where a range changeover mechanism of the automatic transmission completes operation through inertia, the range changeover mechanism is driven by the electric shift actuator.

4. The control apparatus according to claim 1, wherein the predetermined period is a period to completion of operation of a range changeover mechanism of the automatic transmission, the range changeover mechanism is driven by the electric shift actuator.

5. The control apparatus according to claim 1, wherein the vehicle includes a first sensor that is configured to detect an operation position of the electric shift actuator, and
the electronic control unit is configured to determine, based on a signal from the first sensor, whether or not the predetermined period has elapsed.

6. The control apparatus according to claim 1, wherein the vehicle includes a second sensor that is configured to detect an operation position of a range changeover mechanism of the automatic transmission, the range changeover mechanism is driven by the electric shift actuator, and the electronic control unit is configured to determine, based on a signal from the second sensor, whether or not the predetermined period has elapsed.

7. The control apparatus according to claim 1, wherein the vehicle includes a third sensor that detects a valve position of a manual valve of an oil pressure control circuit of the automatic transmission, and the electronic control unit is configured to change over the range of the automatic transmission through changing of the valve position of the manual valve by the electric shift actuator, and the electronic control unit is configured to determine, based on a signal from the third sensor, whether or not the predetermined period has elapsed.

8. The control apparatus according to claim 1, wherein the electronic control unit is configured to determine that the predetermined period has elapsed, when a preset time has elapsed since outputting of a command signal for causing the electric shift actuator to start operation.

9. The control apparatus according to claim 8, wherein a length of a time for determining whether or not the predetermined period has elapsed differs depending on the range of the automatic transmission that is changed over through operation of the electric shift actuator.

* * * * *